(12) United States Patent
Haunhorst (10) Patent No.: US 6,450,199 B1
(45) Date of Patent: Sep. 17, 2002

(54) REFRIGERATION SYSTEM SERVICE COUPLING

(75) Inventor: Gregory A. Haunhorst, Perrysburg, OH (US)

(73) Assignee: Eaton Aeroquip, Inc., Maumee, OH (US)

( * ) Notice: Subject to any disclaimer, the term of this patent is extended or adjusted under 35 U.S.C. 154(b) by 0 days.

(21) Appl. No.: 10/058,555

(22) Filed: Jan. 28, 2002

(51) Int. Cl.$^7$ ................................................ F16L 37/32
(52) U.S. Cl. ........................ 137/614.2; 137/614.03; 137/614.05; 251/282
(58) Field of Search ................. 137/614.05, 614.06, 137/614.04, 614.03, 614, 614.2; 251/149.6, 282

(56) References Cited

U.S. PATENT DOCUMENTS

| | | | |
|---|---|---|---|
| 4,226,257 A | * | 10/1980 | Trinkwalder ................ 137/81.2 |
| 4,921,013 A | | 5/1990 | Spalink et al. |
| 5,139,049 A | * | 8/1992 | Jensen et al. .......... 137/614.05 |
| 5,339,862 A | | 8/1994 | Haunhorst |
| 5,415,200 A | | 5/1995 | Haunhorst et al. |
| 5,450,875 A | | 9/1995 | Chichester et al. |
| 5,586,748 A | | 12/1996 | Kish |
| 5,603,353 A | | 2/1997 | Clark et al. |
| 6,148,858 A | * | 11/2000 | Kirkman ................. 251/282 X |

* cited by examiner

Primary Examiner—Kevin Lee
(74) Attorney, Agent, or Firm—Rader, Fishman & Grauer PLLC (57) ABSTRACT

A service coupling is provided that includes a body portion and an axially moveable valve housing disposed in a central passageway of the body portion. The valve housing includes at least one pressure balancing passage extending therethrough and a service valve sealingly engaged within an inner cavity of the valve housing. An actuator moves the valve housing to a forward position that causes the service valve to abut a port valve of a refrigerant system inlet port and disengage the service valve from sealing engagement within the cavity to open a flow path. The axial movement of the valve housing to the forward position also creates a void between the valve housing and the body portion. The void is provided in communication with the flow path by the at least one pressure balancing passage, such that the refrigerant pressure is substantially balanced on either end of the valve housing.

27 Claims, 5 Drawing Sheets

REFRIGERATION SYSTEM SERVICE COUPLING

BACKGROUND OF THE INVENTION

1. Field of the Invention

The present invention relates to a service coupling for use in directing refrigerant from a refrigerant supply source to a refrigeration system through a charging port which is normally attached to the refrigeration system and in communication therewith. The service coupling may also be used to evacuate refrigerant from a refrigeration system.

2. Description of the Related Art

Traditional refrigerants, such as chlorofluorocarbons (CFCs) and hydrochlorofluorocarbons (HCFCs), are strictly regulated because of their contribution to the depletion of ozone in the atmosphere. The search for new and environmentally benign refrigerants to replace the existing CFCs and HCFCs led to the introduction of hydrofluorocarbons (HFCs), such as R134a. However, HFCs still exhibit a relatively high global-warming potential (GWP) and higher usage costs as compared to natural refrigerants, such as carbon dioxide and ammonia. These concerns have spurred calls for the investigation of alternative refrigeration systems employing refrigerants other than HFCs. The automotive air-conditioning industry has already begun to address the challenges of replacing HFCs, through the development of refrigeration systems employing carbon dioxide as the refrigerant.

Service couplings or adapters used to direct refrigerant from a refrigerant supply source to a refrigeration system through an inlet or "charging" port in the refrigeration system, are well known in the art. One known service coupling employs one or more features that allow for a "quick connect" to the charging port of the refrigeration system. Once connected, a service valve in the service coupling engages and actuates a port valve in the charging port to open a refrigerant flow path between the charging port and the service coupling. The service valve is typically moved into engagement with the port valve by a rotatable knob that is threadably connected to the service coupling.

Conventional service couplings, such as those used to service automotive R134a air-conditioning systems, are generally designed to function at pressures up to approximately 100 psi (6.9 bar). However, refrigeration systems employing carbon dioxide as the refrigerant typically operate at pressures significantly higher than typical R134a refrigeration systems, i.e., greater than 100 psi (6.9 bar).

Due to these relatively high pressures, conventional service couplings suffer from several limitations that generally preclude their use in refrigeration systems employing carbon dioxide. One limitation is that the relatively high refrigerant pressure applies a significant load on the service valve, thereby requiring an excessive amount of torque to turn the knob.

Another limitation is that the "quick connect" features of the service coupling are rendered virtually inoperable due to entrapped pressurized refrigerant between the service coupling and charging port prior to disconnection. This trapped pressure also causes an undesirable violent disconnection of the service coupling from the charging port.

Still another limitation is that the refrigerant flow rate through a conventional service coupling during evacuation of a refrigeration system is relatively high. In a refrigeration system employing carbon dioxide as the refrigerant, a relatively high evacuation flow rate may cause explosive decompression of the seals, i.e., the undesirable rapid expansion of gaseous refrigerant trapped in a seal. A relatively high evacuation flow rate may also lead to the formation of "dry ice" in the charging port or service coupling, which could prevent re-sealing of the service and port valves and allow the refrigerant to escape.

Therefore an improved service coupling is required for charging and evacuating relatively high-pressure refrigerant systems, such as those employing carbon dioxide.

SUMMARY OF THE INVENTION

A service coupling is provided for connecting a refrigerant supply source to a refrigeration system having an charging port that includes an axially displaceable port valve. The service coupling includes a body portion having a central passageway extending along an axis from an adjustment end to an outlet end and a lateral port positioned between the ends providing communication between the central passageway and the refrigerant source. An axially moveable valve housing is disposed in the central passageway. The valve housing extends from a first end positioned between the lateral port and the outlet end and a second end positioned proximate the adjustment end. The valve housing includes at least one pressure balancing passage that extends therethrough from the first end to the second end, and a service valve sealingly engaged within the valve housing. An actuator is provided to move the valve housing from a rearward position toward the adjustment end to a forward position toward the outlet end. Axial movement of the valve housing to the forward position causes the service valve to abut and disengage the port valve from sealing engagement in the charging port and the service valve from sealing engagement in the valve housing to open a refrigerant flow path. Axial movement of the valve housing to the forward position also creates a void between the second end of the valve housing and the body portion. The void is provided in communication with the refrigerant flow path by the at least one passage that extends through the valve housing, such that the pressure is substantially balanced on either end of the valve housing. The balance of pressure on either side of the valve housing results in only a minimum amount of force being required to move the valve housing within the central passageway.

In another embodiment of the present invention, the service coupling is provided with at least one bleed passage for venting pressurized refrigerant trapped between the service coupling and the charging port prior to disconnection. Movement of the valve housing to the forward position seals the bleed passage, whereas movement of the valve housing to the rearward position closes the flow path and permits the residual refrigerant trapped between charging port and service coupling to be released through the unsealed bleed passage.

In yet another embodiment of the present invention, the lateral port is provided with a coupling member for connecting the service coupling to a refrigerant supply/evacuation system. The coupling member includes a check valve or restrictor that is configured to restrict refrigerant flow through the lateral port in a first direction and to permit substantially unrestricted refrigerant flow through the lateral port in a second direction opposite the first direction.

Among other advantages, the novel design of the inventive service coupling permits a refrigerant flow path to be opened between the charging port of a relatively high-pressure system and the service coupling with minimal effort. Another advantage is that the refrigerant trapped between the charging port and the service coupling is automatically vented after closing of the service valve and port valve, permitting an easy and relatively non-violent disconnection of the service coupling from the charging port. Still another advantage is that the flow rate of the refrigerant being evacuated from the refrigerant system is readily controlled by the check valve to minimize the occurrence of explosive decompression or the formation of dry ice.

Various additional aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
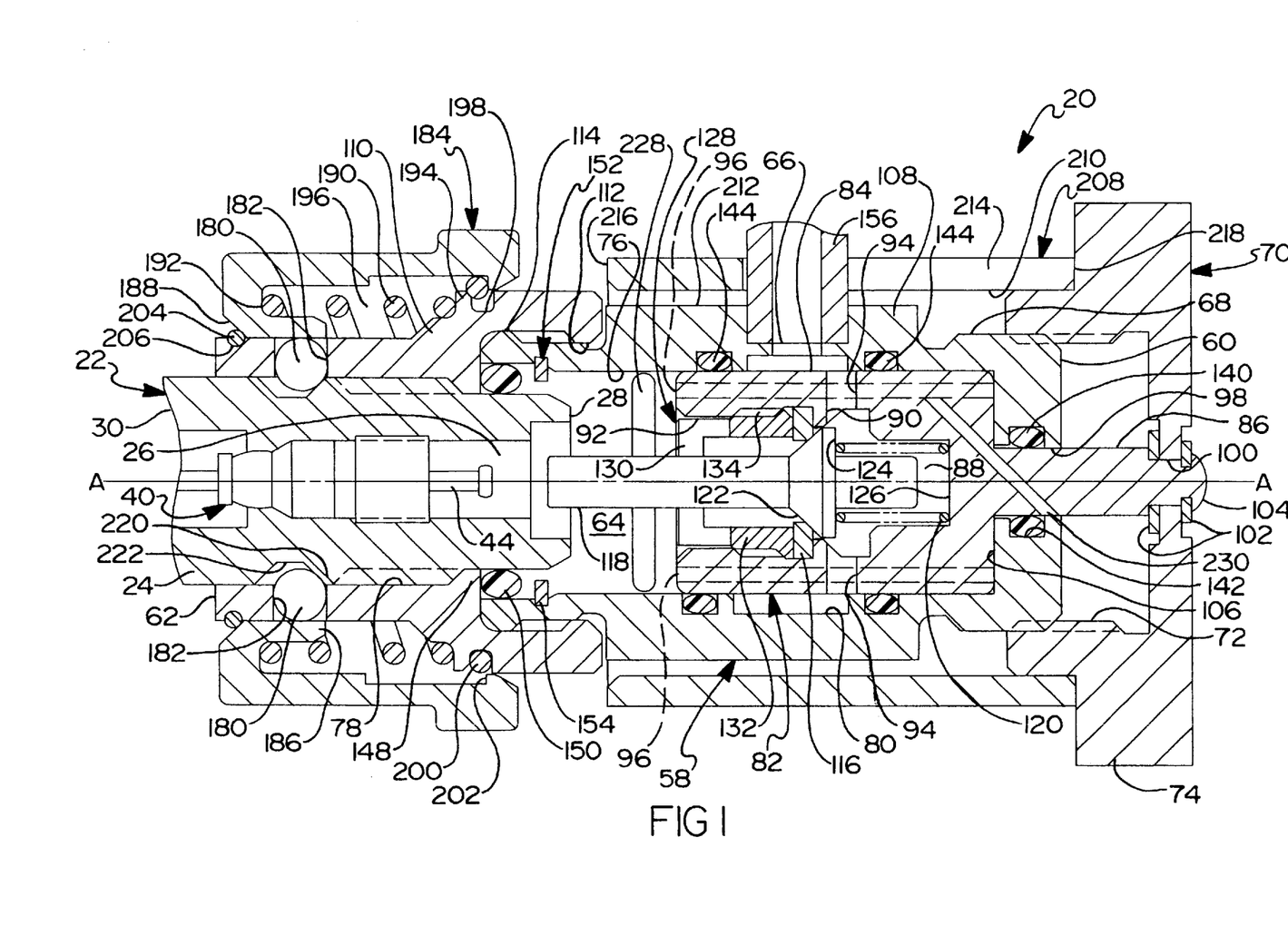
FIG. 1 is a cross sectional view of a service coupling according to a preferred embodiment of the present invention attached to a charging port of a refrigeration system.

Referring now to FIG. 1, there is provided a service coupling 20 intended to be affixed to a charging port 22, which functions as an inlet for refrigerant being introduced into a refrigeration system to which the charging port 22 is connected. When joined together, service coupling 20 and charging port 22 exhibit a common longitudinal axis A—A.

Charging port 22 may be of a conventional type and, in and of itself, forms no part of the present invention. However, a remedial understanding of charging port 22 will assist in explaining operation of service coupling 20.

Figure 5:
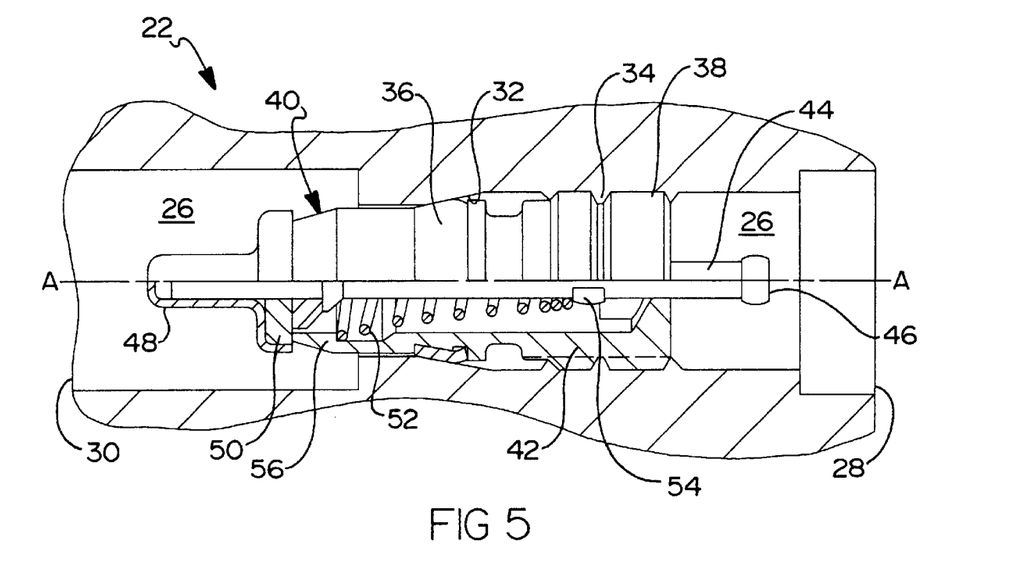
FIG. 5 is an enlarged partial sectional view of the charging port of FIGS. 1–3.

Charging port 22 includes a body 24 having a central passage 26 extending therethrough from an inlet end 28 to an outlet end 30. As illustrated in FIG. 5, central passage 26 includes a reduced diameter cylindrical valve seat 32 and internal threads 34 for engaging a polymeric sealing element 36 and external threads 38, respectively, of a valve core 40.

Figure 2:
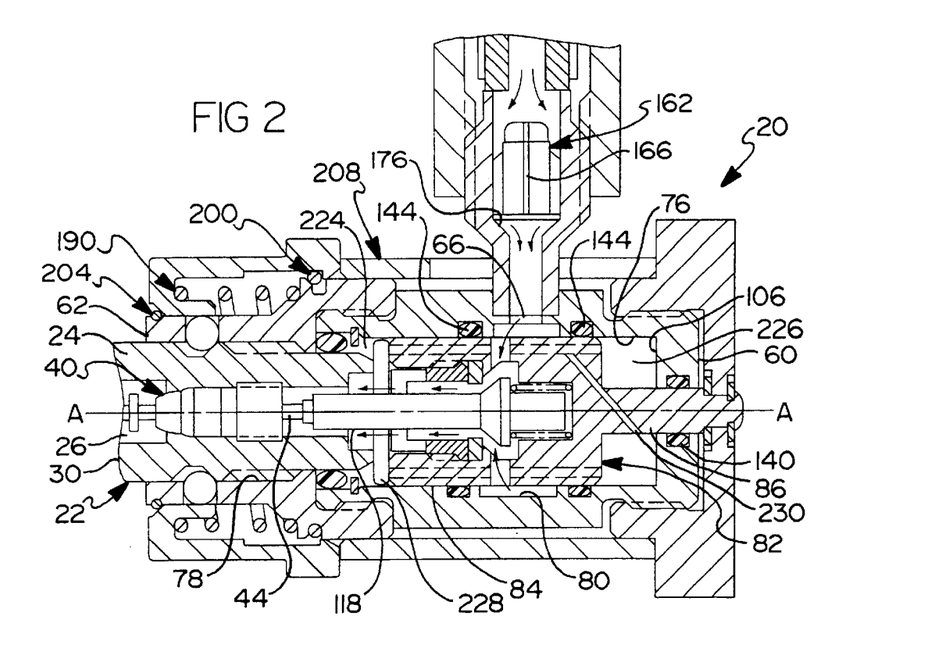
FIG. 2 is a cross sectional view similar to FIG. 1 showing the relative position of the parts in an open position following actuation of a service valve and a port valve.

Referring still to FIG. 5, valve core 40 includes a core body 42 within which a port valve 44 is slidably disposed. A first end 46 of port valve 44 extends outwardly beyond core body 42 and a second end 48 of port valve 44 is connected to a sealing member 50. A compression spring 52 extends between an annular lip 54 of port valve 44 and a radial shoulder 56 on core body 42 to yieldingly urge port valve 44 toward the inlet end 28 and to cause sealing member 50 to sealingly engage core body 42. Movement of port valve 44 toward outlet end 30 (to the left as viewed in FIG. 5) disengages sealing member 50 from core body 42, thereby opening valve core 40 (as shown in FIG. 2) to permit the flow of refrigerant through charging port 22.

Referring to FIG. 1, service coupling 20 includes a body portion 58 that extends from an adjustment end 60 to an outlet end 62. A central passage 64 extends from adjustment end 60 to outlet end 62 and communicates with a lateral port 66 formed in body portion 58 between adjustment end 60 and outlet end 62. Externally disposed threads 68 are formed on body portion 58 adjacent adjustment end 60. A rotatable knob 70 is disposed on adjustment end 60 and includes internal threads 72 that are engaged with threads 68 and an enlarged gripping portion 74 that extends axially beyond adjustment end 60.

Central passage 64 of body portion 58 is provided with a first internal diameter 76 in the vicinity of adjustment end 60, a second internal diameter 78 in the vicinity of outlet end 62 and an enlarged annular channel 80 aligned with lateral port 66. Positioned within central passage 64 is a valve housing 82 sized to be snugly but slidingly received inwardly of first internal diameter 76. Valve housing 82 includes a generally cylindrical body 84, having a central axis common with axis A—A, and an adjustment post 86 that protrudes outwardly from body 84 along axis A—A. Body 84 includes an inner cavity 88 within which inwardly extends a shoulder 90 and internal threads 92. A plurality of flow holes 94 are disposed through body 84 and intersect cavity 88 at a substantially right angle with respect to axis A—A. Body 84 also includes at least one pressure balancing passage 96 (shown in phantom in FIGS. 1–3) that extends from one end of body 84 to the other. Passage 96 is disposed between flow holes 94 such that passage 96 and flow holes 94 do not intersect.

Valve housing 82 is connected to knob 70 for movement therewith as knob 70 is threaded onto and off of body portion 58. In a preferred embodiment, a portion of adjustment post 86 extends through a hole 98 in body portion 58 and a axially aligned hole 100 in knob 70. A pair of washers 102 are disposed over adjustment post 86 on either side of knob 70. During manufacture of service coupling 20, a distal end 104 of adjustment post 86 is swaged or otherwise deformed to prevent washers 102 and knob 70 from sliding off adjustment post 86 during rotation. Washers 102 slide against knob 70, permitting knob 70 to rotate freely with respect to adjustment post 86.

Rotation of knob 70, and the axial movement thereof resulting from inter-engagement of threads 68 and 72, causes valve housing 82 to (1) move axially to a rearward position toward adjustment end 60 (to the right in FIGS. 1–3) upon rotation of knob 70 in a first predetermined direction and (2) move it to a forward position toward outlet end 62 upon rotation of knob 70 in the opposite direction. Excessive retraction of valve housing 82 toward adjustment end 60 is prevented by abutment of valve housing 82 with a shoulder 106 formed in body portion 58 between first internal diameter 76 and hole 98.

Figure 3:
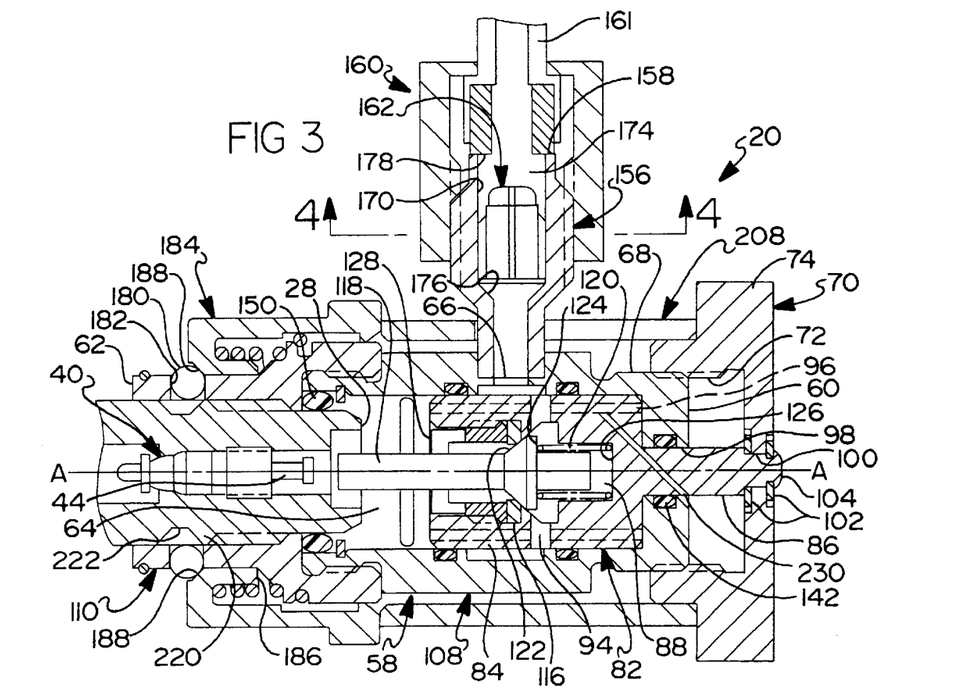
FIG. 3 is a cross sectional view similar to FIG. 1 showing the relative position of the parts in a closed position during disconnection of the service coupling from the charging port.

Depending on the external diameters of charging port 22 and valve housing 82, body portion 58 may be optionally divided into two or more sections to facilitate assembly of service coupling 20. As illustrated in FIGS. 1–3, body portion 58 is preferably divided into a first section 108 that includes first internal diameter 76 and a second section 110 that includes second internal diameter 78. Second section 110 includes an internally threaded portion 112 that is threaded onto an externally threaded portion 114 of first section 108 during assembly. In the embodiment illustrated in FIGS. 1–3, because the external diameter of valve housing 82 is larger than second internal diameter 78, valve housing 82 is assembled into first section 108 prior to securing second section 110 to first section 108. However, in an alternate embodiment of the present invention (not illustrated), valve housing 82 may exhibit an external diameter that is smaller than second internal diameter 78 allowing body portion 58 to be manufactured as a single member.

Received within cavity 88 of valve housing 82 is a sealing member 116 and a service valve 118 that is biased against sealing member 116 by a resiliently compressible member 120, such as a compression spring. Sealing member 116, which is preferably manufactured of a polymeric material, such as EPDM rubber or PTFE, abuts inwardly directed shoulder 90. Sealing member 116 is preferably a flat, annular gasket, as illustrated in FIGS. 1–3 or, alternatively, may be an O-ring. Service valve 118 includes a generally conical seat 122 extending therefrom that sealingly engages sealing member 116 to substantially prevent refrigerant flow through service coupling 20. One end of resiliently compressible member 120 abuts a shoulder 124 of seat 122 and the other end abuts an inner wall 126 of cavity 88.

A valve retainer 128 is also received in cavity 88 to secure sealing member 116, service valve 118 and resilient compressible member 120 within cavity 88 of valve housing 82. Valve retainer 128 preferably includes a guide portion 130, through which service valve 118 extends, and a cylindrical base portion 132 having external threads 134 that engage internal threads 92 in cavity 88. Guide portion 132 is a generally rectangular member having a width large enough to support service valve 118, yet narrow enough to allow the passage of refrigerant, as illustrated in FIG. 2. Base portion 132 of valve retainer 128 abuts sealing member 116 to maintain sealing member 116 against shoulder 90.

Figure 6:
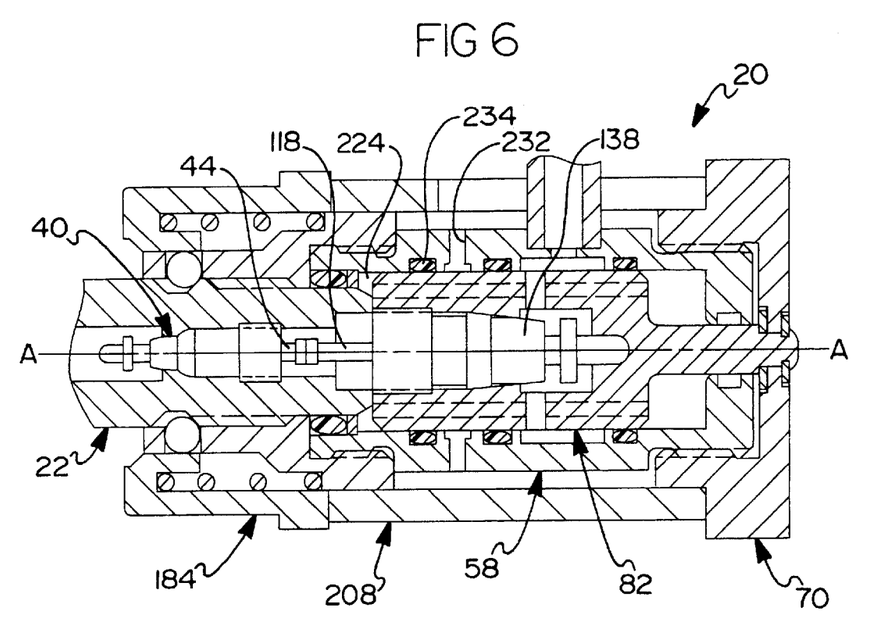
FIG. 6 is a cross sectional view of an alternate embodiment of the present invention showing the service coupling attached to the charging port with the service valve and the port valve in the open position.
Figure 7:
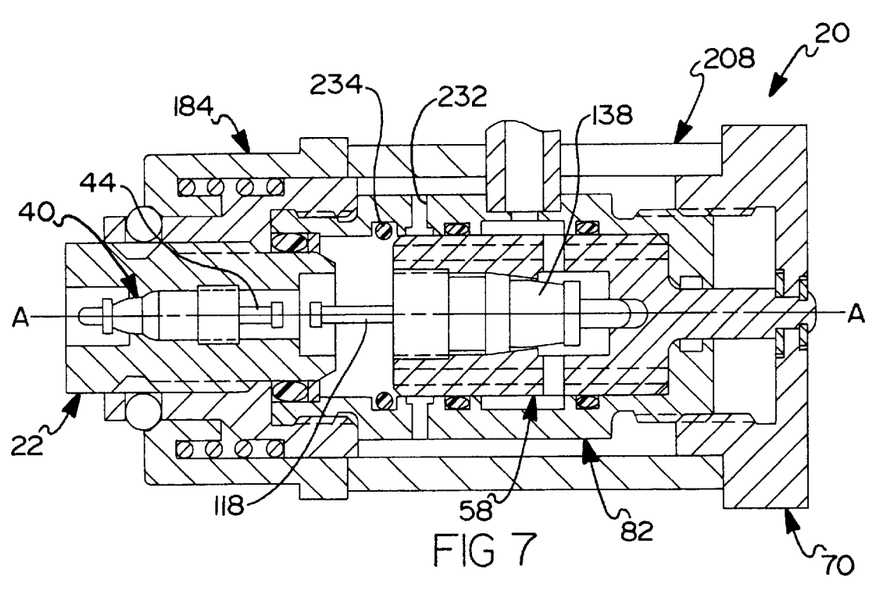
FIG. 7 is a cross sectional view of the service coupling of FIG. 6 showing the service valve and the port valve in the closed position.

Referring to FIGS. 6 and 7, an alternate embodiment of valve housing 82 is shown in detail. In this embodiment, service valve 118, sealing member 116 and valve retainer 128 comprise a valve core assembly 138. Valve core assembly 138 may be substantially similar to valve core 40 described above in charging port 22, but is not necessarily limited thereto. Accordingly, other valve core assembly designs, such as those commonly found in tire stems, may also be suitable for use in the present invention. Employing valve core assembly 138 in place of individual components 116, 118 and 128 advantageously eliminates one or more manufacturing steps and allows easy replacement of worn or damaged seals.

Referring again to FIG. 1, an annular sealing element 140 is disposed in a first outwardly directed groove 142 positioned in an inner wall of hole 98 to substantially prevent the escape of refrigerant when valve housing 82 is moved to the forward position toward outlet end 62. Similarly, a pair of annular sealing elements 144 are provided in body portion 58 on the adjustment end side and the outlet end side of lateral port 66. Sealing elements 144 abut valve housing 82 and substantially prevent the passage of refrigerant between body portion 58 and valve housing 82. Sealing elements 140 and 144 may be a typical rubber O-ring or a PTFE spring energized "U-cup," as is known in the art.

Body portion 58, and more particularly second section 110, preferably includes an inwardly directed shoulder 148 against which is held an annular sealing member 150, such as an O-ring. Sealing member 150 sealingly engages charging port 22 as it is received in service coupling 20 to seal against the escape of refrigerant between charging port 22 and service coupling 20. Sealing member 150 is restricted against substantial axial movement within passage 64 by shoulder 148 and a snap-ring 152 that is received within an outwardly facing groove 154 in first internal diameter 76.

Referring now to FIG. 3, lateral port 66 is preferably provided with a coupling member 156 for connecting service coupling 20 to a source of refrigerant (not illustrated). In a preferred embodiment, an external end 158 of coupling member 156 is configured to mate with a female coupling 160 that is attached to a fitting 161 of a service hose or other conduit for transferring refrigerant from a conventional refrigerant supply/evacuation system. The coupling member 156 design illustrated in FIGS. 2 and 3 is not intended to limit the scope of the invention, and may include other configurations, such as a conventional female threaded adapter.

Figure 4:
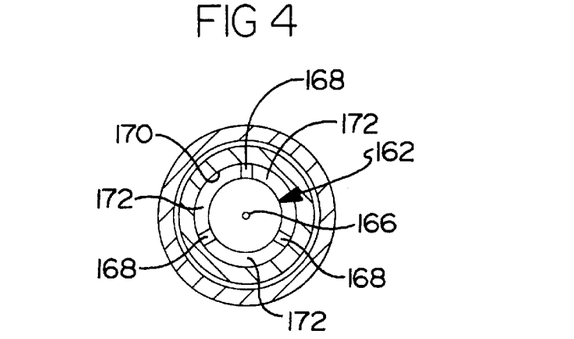
FIG. 4 is a cross sectional view of a coupling member taken along lines 44 in FIG. 3.

Within coupling member 156 is disposed a check valve or restrictor 162 to regulate the flow rate of refrigerant exiting charging port 22 through service coupling 20. Referring to FIG. 4, restrictor 162 includes an axial capillary duct 166 having a predetermined diameter that corresponds to the desired refrigerant flow rate. Restrictor 162 is provided with a plurality of radial fins 168 that cooperate with an interior surface 170 of coupling member 156 to create a plurality of flow channels 172 (best seen in FIG. 4) for the free flow of refrigerant. A void 174 (best seen in FIG. 3), which is defined between a tapered surface 176 of coupling member 156 and a shoulder 178 of female coupling 160, allows for a limited degree of axial movement of restrictor 162. As illustrated in FIG. 2, when the flow of refrigerant is entering service coupling 20 from the refrigerant supply/evacuation system, restrictor 162 is forced against tapered surface 176, permitting a substantially unrestricted flow of refrigerant through flow channels 172. Alternatively, when the flow of refrigerant is entering service coupling 20 from charging port 22, restrictor 162 is forced against shoulder 178, thereby restricting the flow of refrigerant through capillary 166.

Referring again to FIG. 1, service coupling 20 is preferably connected to charging port 22 by a plurality of detent balls 180 located within radial holes 182 defined in the wall of body portion 58 adjacent outlet end 62. An annular locking sleeve 184 encircles body portion 58 adjacent outlet end 62 and is axially slideable thereon. Locking sleeve 184 is provided with an inwardly facing flange 186 having a conical cam surface 188 flaring outwardly therefrom in a direction toward outlet end 62. A resilient member 190, such as a compression spring or the like, biases locking sleeve 184 toward outlet end 62. Extending radially outwardly from flange 186 is a shoulder 192 that cooperates with an outwardly directed flange 194 on body portion 58 to define a chamber 196 within which resilient member 190 is positioned to yieldingly urge locking sleeve 184 toward outlet end 62.

The area of body portion 58 adjacent flange 194 is preferably provided with an inwardly facing annular groove 198 in which is positioned a retaining ring 200. Retaining ring 200 abuts both flange 194 and a shoulder 202 on locking sleeve 184, as shown in FIG. 1, to prevent the removal of locking sleeve 184 from body portion 58. Alternatively, or in combination with retaining ring 200, a second retaining ring 204 may be disposed in a groove 206 proximate outlet end 62, which also functions to prevent removal of locking sleeve 184 from body portion 58.

Service coupling 20 is preferably provided with an interlock sleeve 208 to prevent the inadvertent release of service coupling 20 from charging port 22 when the refrigerant flow path is open. Referring to FIGS. 1–3, interlock sleeve 208 is a generally cylindrical member having an inner diameter 210 that is slightly larger than the external diameter 212 of body portion 58. Interlock sleeve 208 is provided with a channel 214 having a width slightly larger than the diameter of coupling member 156. A first end 216 of interlock sleeve 208 engages locking sleeve 184 and a second end 218 of interlock sleeve 208 engages knob 70. Referring to FIG. 2, when knob 70 has been rotated to a position that causes service valve 118 and port valve 44 to open, interlock sleeve 208 abuts locking sleeve 184 to prevent locking sleeve 184 from being retracted to a position that would release charging port 22. On the other hand, as illustrated in FIG. 3, when knob 70 is rotated to a position that closes service valve 118 and port valve 44, interlock sleeve 208 can be slid on body portion 58 to a position that allows locking sleeve 184 to release charging port 22.

In operation, when service coupling 20 is disengaged from charging port 22, locking sleeve 184 will be in its non-retracted or forward position shown in FIG. 2 and held in such position by the biasing force of resilient member 190. Service coupling 20 is engaged to charging port 20 by retracting locking sleeve 184, as shown in FIG. 3, which allows detent balls 180 to move outwardly as service coupling 20 engages charging port 22.

As service coupling 20 engages charging port 22, inlet end 28 of charging port 22 will enter into outlet end 62 of service coupling 20 and sealingly engages sealing member 150. Further axial movement of charging port 22 toward adjustment end 60 causes detent balls 180 to ride over a shoulder 220 on charging port 20 until detent balls 180 are radially in line with a groove 222 in charging port 22. Detent balls 180 are forced radially inwardly as a result of the urging of locking sleeve 184 toward outlet end 62 in response to urging of resilient member 190 and the action of conical cam surface 188 forcing detent balls 180 radially inwardly. Detent balls 180 engage a side of shoulder 220 furthest removed from charging port inlet end 28 to secure service coupling 20 to charging port 22.

With service coupling 20 and charging port 22 thus engaged, as illustrated in FIG. 1, it should be noted that there is no flow of refrigerant through the joined parts. Thus, within charging port 22, sealing member 50 is sealingly engaged with core body 42, and within service coupling 20, service valve 118 is sealingly engaged with sealing member 116.

Prior to opening of service valve 118 and port valve 44, service coupling 20 is pressurized through the service hose or other conduit that is attached to the refrigerant supply/evacuation system. Sealing members 144 on either side of lateral port 66 prevent refrigerant from passing between body portion 58 and valve housing 82. Therefore, there is no pressure force acting axially on valve assembly 82 that would inhibit rotation of knob 70 to open service coupling 20.

To open service coupling 20 and charging port 22 to the flow of refrigerant through lateral port 66, knob 70 is rotated in a first predetermined direction causing knob 70 to move axially to the position shown in FIG. 2. Such rotation of knob 70 does not cause substantial rotation of valve housing 82 as a result of frictional resistance to such rotation by virtue of valve housing 82 being in contact with sealing members 140 and 144. Axial movement of valve housing 82 from the position of FIG. 1 to the position of FIG. 2 causes service valve 118 to directly engage port valve 44.

Once service valve 118 contacts port valve 44, there is some resistance to further axial movement of valves 118, 44 due to pressure in the refrigeration system acting against port valve 44. However, this resistance is generally insignificant due to the relatively small diameter of port valve 44. Referring to FIG. 2, as valves 118 and 44 begin to open, a first cavity 224, that is formed between charging port 22 and valve housing 82, quickly fills with pressurized refrigerant. Virtually simultaneously, passage 96 allows a second cavity or void 226, formed between valve housing 82 and shoulder 106, to reach the same pressure. The substantially balanced pressure on either side of valve housing 82 results in only a minimal axial force (generally the combined biasing force of the compressing valve springs) being applied to knob 70. Therefore, an acceptable amount of torque is all that is required to rotate knob 70. Complete rotation of knob 70 in the first predetermined direction causes service valve 118 and port valve 44 to be actuated to the fully retracted or "open" positions, permitting full refrigerant flow.

Depending on the biasing force exerted against both service valve 118 and port valve 44, it is possible that service valve 118 will not be actuated to the fully "open" position. To ensure that service valve 118 is fully actuated, a dowel pin 228 may be provided through the portion of service valve 118 that extends outwardly beyond valve housing 82. During insertion of charging port 22 into service coupling 20, inlet end 28 of charging port 22 will engage dowel pin 228 and actuate service valve 118 to the fully "open" position shown in FIG. 2.

In order to disconnect service coupling 20 from charging port 22, it is simply necessary to rotate knob 70 to close valves 118, 44 and manually retract locking sleeve 184 to the position shown in FIG. 3. This retraction moves shoulder 188 of locking sleeve 184 out of engagement with detent balls 180 and thereby aligns detent balls 180 with the enlarged cylindrical wall 182 permitting detent balls 180 to move radially outwardly to disengage them from shoulder 220 of charging port 22. However, manual retraction of locking sleeve 184 is rendered difficult if not impossible due to the trapped refrigerant pressure in first cavity 224. The trapped refrigerant exerts an axial force on charging port 22, which is redirected into locking sleeve 184 through detent balls 180. Therefore, it is necessary to vent the pressure trapped in first cavity 224 prior to disconnecting service coupling 20.

To reduce pressure in first cavity 224, a pressure bleed passage 230 is provided between first cavity 224 and the exterior of service coupling 20. In a preferred embodiment of the present invention, pressure bleed passage 230 extends between channel 96 and an exterior surface of adjustment post 96, as illustrated in FIGS. 2 and 3. When valve housing 82 is moved to the forward position toward outlet end 62, pressure bleed passage 230 assists longitudinal channels 96 in providing first cavity 224 in communication with second cavity 226, as shown in FIG. 1. When valve housing 82 is moved to the rearward position toward adjustment end 60, pressure bleed passage 230 extends beyond sealing member 142, as shown in FIG. 3, allowing the pressure in first cavity 224 to be vented to the environment. The release of refrigerant to the environment is very small, as is characteristic of conventional service couplings. In an alternate embodiment, as illustrated in FIG. 8, a pressure bleed passage 230' or 230"

may be provided through adjustment post 86, such that the pressure in second cavity 226 is vented to the environment when valve housing 82 is moved to the rearward position.

Figure 8:
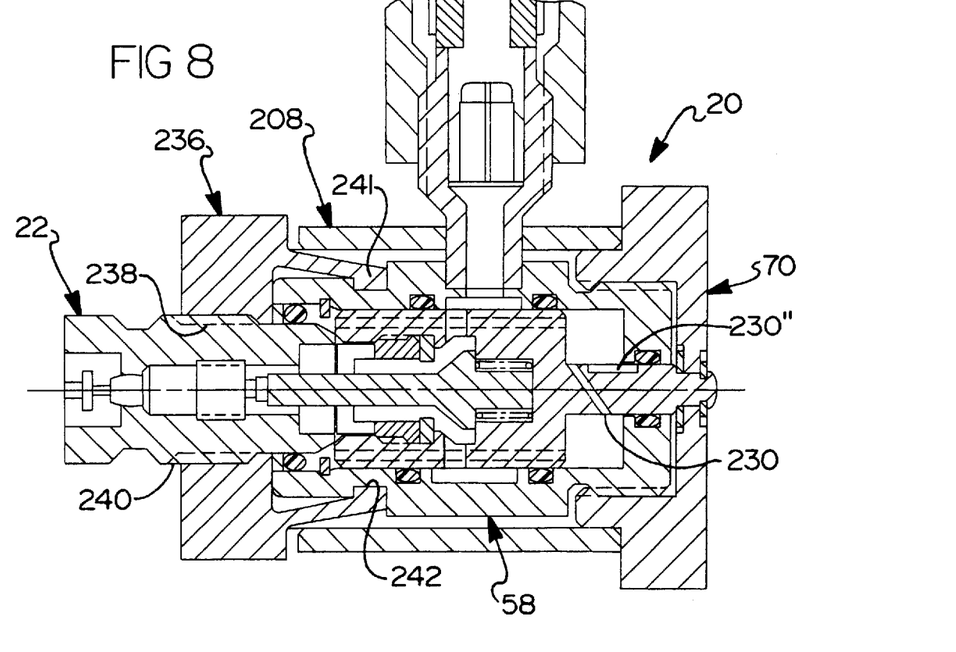
FIG. 8 is a cross sectional view of another alternate embodiment of the present invention showing the service coupling attached to the charging port with the service valve and the port valve in the open position.

Alternatively, or in combination with the bleed passage configurations illustrated in FIGS. 1 and 8, at least one bleed passage 232 may be provided directly through body portion 58 to vent the pressure in first cavity 224 to the environment, as illustrated in FIGS. 6 and 7. In this embodiment, an additional sealing member 234 is required in body portion 58 downstream of pressure bleed passage 232 to seal against valve housing 82 when valve housing 82 is moved to the forward position. When valve housing 82 is retracted to the rearward position toward adjustment end 60, as shown in FIG. 7, sealing member 234 is disengaged from valve housing 82 allowing the trapped pressure in first cavity 224 to escape through bleed passage 232.

Referring to FIG. 8, another alternate embodiment of the present invention is shown in detail. In this embodiment, service coupling 20 is provided with a rotatable nut 236 instead of a retractable locking sleeve 184 to secure service coupling 20 to charging port 22. Nut 236 is provided with an internally threaded surface 238 that engages an externally threaded surface 240 of charging port 22. Nut 236 also includes an anchor portion 241 that engages a inwardly directed groove 242 in body portion 58. Anchor portion 241 allows nut 236 to rotate with respect to body portion 58, but prevents axial movement thereon. To prevent the inadvertent release of charging port 22, interlock sleeve 208 may be provided with an internally splined surface that engages an externally splined surface (none illustrated) on nut 236 as interlock sleeve 208 is moved forward due to rotation of knob 70.

Figure 9:
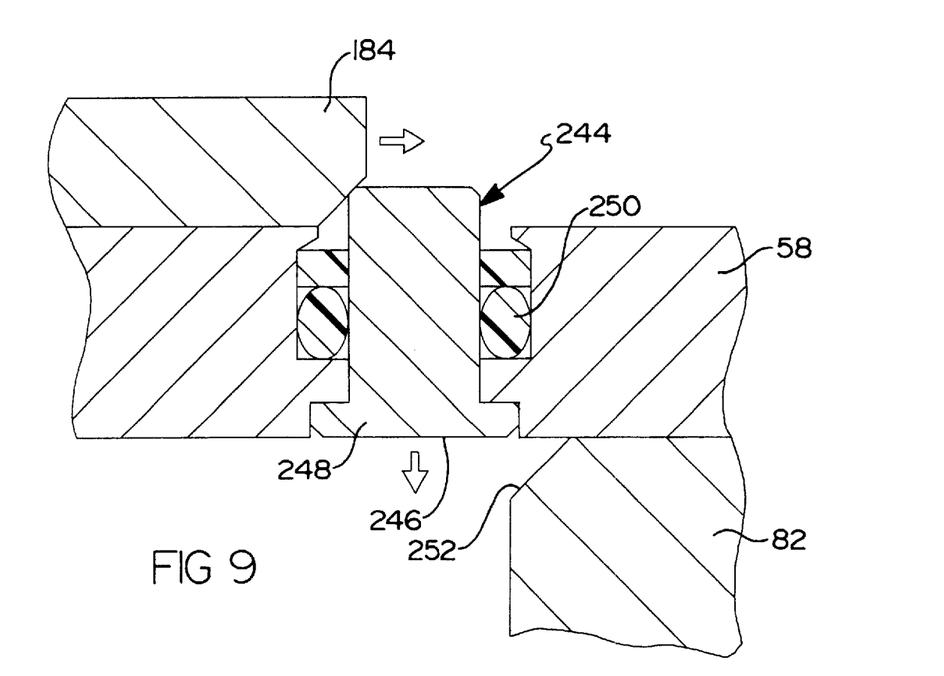
FIG. 9 is a enlarged cross sectional view of still another alternate embodiment of the present invention showing the relative position of a locking sleeve, pin and valve housing during disconnection of the service coupling from the charging port.

Referring to FIG. 9, an alternate embodiment of the present invention is shown in detail. In this embodiment, service coupling 20 does not include an interlock sleeve 208 to prevent inadvertent release of charging port 22. Instead, a radially moveable pin 244 is provided in body portion 58 that extends radially outwardly when valve housing 82 is actuated toward outlet end 62 to prevent locking sleeve 184 from sliding to a position that would release charging port 22. As illustrated in FIG. 9, an inner end 246 of pin 244 is provided with a chamfered head portion 248. Escape of refrigerant is substantially prevented through the use of at least one sealing member 250, such as an O-ring, between pin 240 and body portion 58. Valve housing 82 is provided with a chamfered end 252 that engages head portion 248 as valve housing 82 is moved to a forward position toward outlet end 62. This engagement, either alone or in combination with the refrigerant pressure present between valve housing 82 and body portion 58 due to the opening of service valve 118 and port valve 44, causes pin 244 to move outwardly until a portion of pin 244 protrudes from body portion 58. The protruding portion of pin 244 engages and prevents the inadvertent retraction of locking sleeve 184 when valves 118 and 44 are open. Once valve housing 82 is moved to a rearward position toward adjustment end 60 and valves 188 and 44 are closed, locking sleeve 184 can be retracted causing pin 244 to be pushed into body portion 58.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A service coupling for connecting a refrigerant source to a refrigeration system having an inlet port that includes an axially displaceable port valve, comprising:
   (a) a body portion extending along an axis from an adjustment end to an outlet end, the body portion including a central passageway and a lateral port positioned between the ends to provide communication between the central passageway and the refrigerant source;
   (b) an axially moveable valve housing received in the central passageway, the valve housing including an inner cavity in communication with the lateral port to form a flow path, a service valve sealingly engaged within the inner cavity to close the flow path, and at least one pressure balancing passage extending therethrough;
   (c) a connector releasably engaging the service coupling to the inlet port; and
   (d) an actuator for moving the valve housing from a rearward position toward the adjustment end to a forward position toward the outlet end, wherein axial movement of the valve housing to the forward position causes the service valve to abut and disengage the port valve from sealing engagement in the inlet port and the service valve from sealing engagement in the valve housing to open the flow path, and wherein axial movement of the valve housing to the forward position creates a void between an end of the valve housing and the body portion, the void provided in communication with the flow path by the at least one pressure balancing passage such that the refrigerant pressure is substantially balanced on either end of the valve housing.

2. The service coupling according to claim 1, further including at least one bleed passage for venting refrigerant trapped between the service coupling and the inlet port prior to disconnection.

3. The service coupling according to claim 2, wherein when the valve housing is moved to the rearward position, the bleed passage provides the at least one pressure balancing passage in communication with the exterior of the body portion.

4. The service coupling according to claim 2, wherein when the valve housing is moved to the forward position, the flow path is prevented from communicating with the bleed passage by at least one sealing member.

5. The service coupling according to claim 4, wherein when the valve housing is moved to the rearward position, the bleed passage becomes unsealed allowing refrigerant trapped between inlet port and service coupling to be released.

6. The service coupling according to claim 1, wherein the lateral port includes a coupling member having a restrictor that restricts fluid flow through the service coupling in a first direction and permits substantially unrestricted fluid flow in a second direction opposite the first direction.

7. The service coupling according to claim 1, wherein the service valve includes a dowel member for engagement by the inlet port to disengage the service valve from sealing engagement within the valve housing.

8. The service coupling according to claim 1, wherein the valve housing includes an annular sealing member, the service valve being biased into sealing contact with the annular sealing member by a resiliently compressible member when the valve housing is in the rearward position and disengaged from sealing contact with the annular sealing member when the valve housing is moved to the forward position.

9. The service coupling according to claim 8, wherein the service valve, annular sealing member and resiliently compressible member are secured in the valve housing by a valve retainer.

10. The service coupling according to claim 1, wherein the service valve is a component of a valve core assembly that is received in the valve housing.

11. The service coupling according to claim 1, further including an interlock member that engages the connector when the flow path is open to prevent the service coupling from being released from the inlet port.

12. A service coupling for connecting a refrigerant source to a refrigeration system having an inlet port that includes an axially displaceable port valve, comprising:
   (a) a body portion extending along an axis from an adjustment end to an outlet end, the body portion including a central passageway and a lateral port positioned between the ends to provide communication between the central passageway and the refrigerant source;
   (b) an axially moveable valve housing received in the central passageway, the valve housing including an inner cavity in communication with the lateral port to form a flow path and a service valve sealingly engaged within the inner cavity to close the flow path;
   (c) at least one bleed passage for venting refrigerant trapped between the service coupling and the inlet port prior to disconnection;
   (d) a connector releasably engaging the service coupling to the inlet port; and
   (e) an actuator for moving the valve housing from a rearward position toward the adjustment end to a forward position toward the outlet end, the axial movement of the valve housing causing the service valve to abut and disengage the port valve from sealing engagement in the inlet port and the service valve from sealing engagement in the valve housing to open the flow path, wherein movement of the valve housing to the forward position seals the bleed passage and movement of the valve housing to the rearward position closes the flow path and permits refrigerant trapped between inlet port and service coupling to be released through the unsealed bleed passage.

13. The service coupling according to claim 12, wherein the lateral port includes a coupling member having a restrictor that restricts fluid flow through the service coupling in a first direction and permits substantially unrestricted fluid flow in a second direction opposite the first direction.

14. The service coupling according to claim 12, wherein the valve housing includes an annular sealing member, the service valve being biased into sealing contact with the annular sealing member by a resiliently compressible member when the valve housing is in the rearward position and disengaged from sealing contact with the annular sealing member when the valve housing is moved to the forward position.

15. The service coupling according to claim 14, wherein the service valve, annular sealing member and resiliently compressible member are secured in the valve housing by a valve retainer.

16. The service coupling according to claim 12, wherein the service valve is a component of a valve core assembly that is received in the valve housing.

17. The service coupling according to claim 12, further including an interlock member that engages the connector when the flow path is open to prevent the service coupling from being released from the inlet port.

18. A service coupling for connecting a refrigerant source to a refrigeration system having an inlet port that includes an axially displaceable port valve, comprising:
   (a) a body portion extending along an axis from an adjustment end to an outlet end, the body portion including a central passageway and a lateral port positioned between the ends to provide communication between the central passageway and the refrigerant source, the lateral port including a coupling member having a restrictor that restricts fluid flow through the service coupling in a first direction and permits substantially unrestricted fluid flow in a second direction opposite the first direction;
   (b) an axially moveable valve housing received in the central passageway, the valve housing including an inner cavity in communication with the lateral port to form a flow path and a service valve sealingly engaged within the inner cavity to close the flow path;
   (c) a connector releasably engaging the service coupling to the inlet port; and
   (d) an actuator for moving the valve housing from a rearward position toward the adjustment end to a forward position toward the outlet end, the axial movement of the valve housing causing the service valve to abut and disengage the port valve from sealing engagement in the inlet port and the service valve from sealing engagement in the valve housing to open the flow path.

19. The service coupling according to claim 18, wherein the valve housing includes an annular sealing member, the service valve being biased into sealing contact with the annular sealing member by a resiliently compressible member when the valve housing is in the rearward position and disengaged from sealing contact with the annular sealing member when the valve housing is moved to the forward position.

20. The service coupling according to claim 19, wherein the service valve, annular sealing member and resiliently compressible member are secured in the valve housing by a valve retainer.

21. The service coupling according to claim 18, wherein the service valve is a component of a valve core assembly that is received in the valve housing.

22. The service coupling according to claim 18, further including an interlock member that engages the connector when the flow path is open to prevent the service coupling from being released from the inlet port.

23. A service coupling for connecting a refrigerant source to a refrigeration system having an inlet port that includes an axially displaceable port valve, comprising:
   (a) a body portion extending along an axis from an adjustment end to an outlet end, the body portion including a central passageway and a lateral port positioned between the ends to provide communication between the central passageway and the refrigerant source, the lateral port including a coupling member having a restrictor that restricts fluid flow through the service coupling in a first direction and permits substantially unrestricted fluid flow in a second direction opposite the first direction;
   (b) an axially moveable valve housing received in the central passageway, the valve housing including an inner cavity in communication with the lateral port to form a flow path, a service valve sealingly engaged within the inner cavity to close the flow path, and at least one pressure balancing passage extending therethrough;

(c) at least one bleed passage for venting refrigerant trapped between the service coupling and the inlet port prior to disconnection;

(d) a connector releasably engaging the service coupling to the inlet port; and (e) an actuator for moving the valve housing from a rearward position toward the adjustment end to a forward position toward the outlet end, wherein axial movement of the valve housing to the forward position seals the bleed passage and causes the service valve to abut and disengage the port valve from sealing engagement in the inlet port and the service valve from sealing engagement in the valve housing to open a refrigerant flow path, the axial movement of the valve housing to the forward position creating a void between the valve housing and the body portion, the void provided in communication with the flow path by the at least one pressure balancing passage such that the refrigerant pressure is substantially balanced on either end of the valve housing, and wherein movement of the valve housing to the rearward position closes the flow path and permits refrigerant trapped between inlet port and service coupling to be released through the unsealed bleed passage.

24. The service coupling according to claim 23, wherein the valve housing includes an annular sealing member, the service valve being biased into sealing contact with the annular sealing member by a resiliently compressible member when the valve housing is in the rearward position and disengaged from sealing contact with the annular sealing member when the valve housing is moved to the forward position.

25. The service coupling according to claim 24, wherein the service valve, annular sealing member and resiliently compressible member are secured in the valve housing by a valve retainer.

26. The service coupling according to claim 23, wherein the service valve is a component of a valve core assembly that is received in the valve housing.

27. The service coupling according to claim 23, further including an interlock member that engages the connector when the flow path is open to prevent the service coupling from being released from the inlet port.

* * * * *